3,704,095
TREATMENT OF GASES
Thomas Nicklin, Manchester, England, assignor to The Gas Council, London, England
Filed Feb. 2, 1971, Ser. No. 111,814
Int. Cl. C01b 17/04
U.S. Cl. 423—242
8 Claims

ABSTRACT OF THE DISCLOSURE

A composition suitable for use in removing sulphur oxides from gas containing sulphur oxides (such as flue gas) is described. The composition essentially comprises (i) an oxide of uranium and/or a precursor therefor, (ii) an oxide of thorium and/or a precursor therefor, and (iii) an alkali metal or alkaline earth metal oxide and/or a precursor therefor. The constituent (iii) is preferably sodium or lithium oxide, and the composition is preferably disposed on a carrier such as α-alumina. The composition may be regenerated after use by exposure to a hydrogen-containing gas.

---

Figure 1:
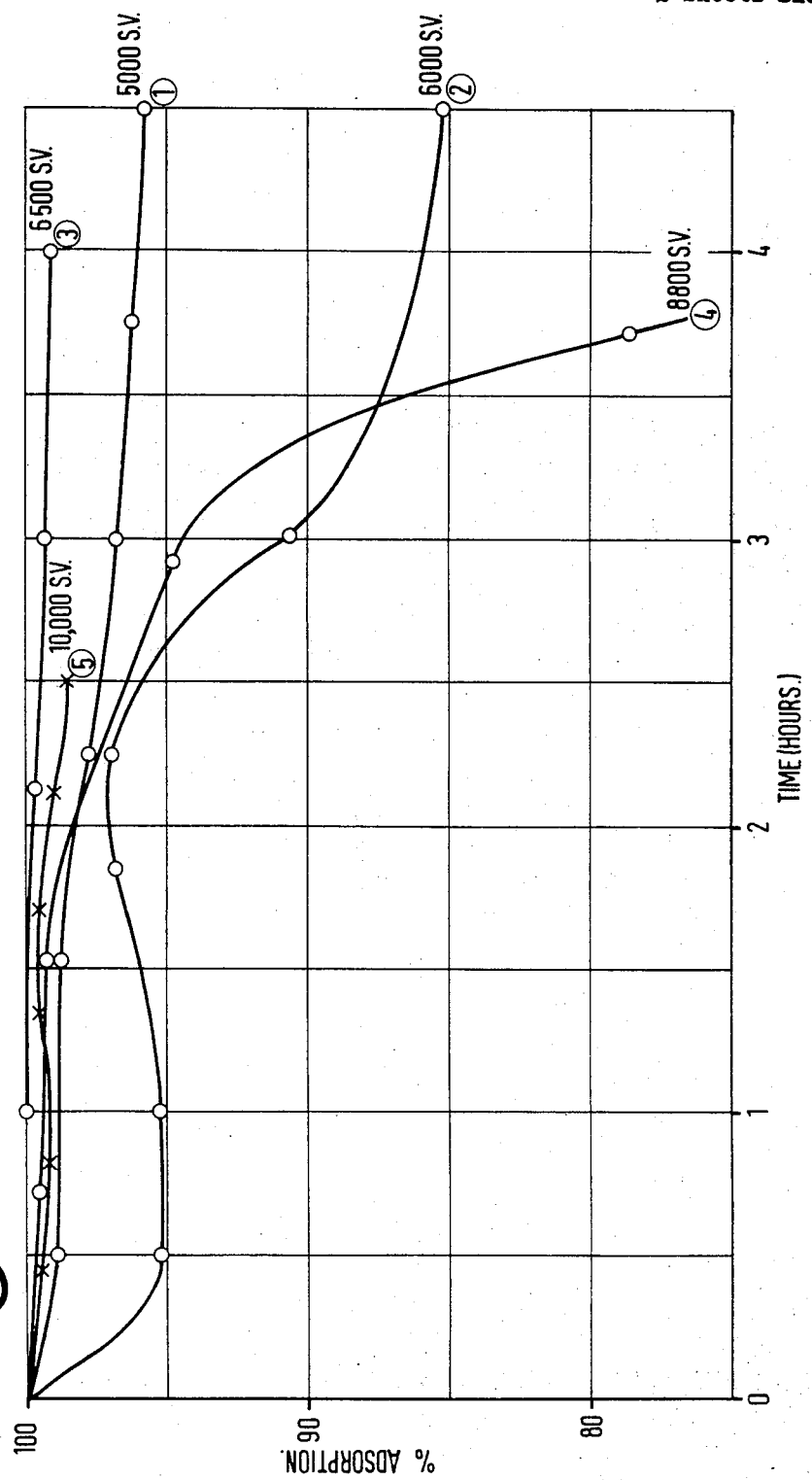

The invention relates to the treatment of gases. More particularly the invention relates to a process for the removal of sulphur oxides from gases, for example flue gases and like gaseous mixtures, and to compositions for use in such a process.

The removal of sulphur from flue gas has been a problem of power stations and refineries for many years. Not only has legislation placed strictures on the discharge of sulphur compounds into the atmosphere, but it has also been realised that, if this sulphur could be economically recovered, the sale thereof could represent a source of revenue.

According to the present invention, therefore, there is provided a composition suitable for use in removing sulphur oxides from sulphur oxide containing gas (such as flue gas and like gaseous mixtures), which composition comprises an oxide of uranium and/or a precursor therefor, an oxide of thorium and/or a precursor therefor, and an oxide of an alkali metal or of an alkaline earth metal and/or a precursor therefor.

By the term "precursor" as used in this specification, is meant a compound which, either by heat, or reduction, or under the conditions of the process of the invention, may be converted to the compound for which it is a precursor.

It is preferred that the composition comprises an alkali metal oxide and/or precursor, although oxides of magnesium, calcium, strontium and of barium may be used. Of the alkali metals, sodium and lithium are preferred, although oxides of potassium, rubidium or cesium and/or precursors therefor may be employed.

Each of the three essential components of the composition may itself by constituted by a mixture of compounds. Thus the uranium component may be present as uranoso-uranic oxide, $U_3O_8$ and as uranium trioxide. Also, a mixture of two or more alkali metal compounds or alkali metal earth compounds, or a mixture of alkali metal compounds and alkali metal earth compounds may be present in the composition.

The three active constituents of the sorbing composition are preferably disposed on the surface of a carrier. α-Alumina is preferred as the carrier, but γ-alumina, silica, natural clays, kaolin, powdered brick, silicon carbide, alkaline earth metal oxides and molecular seives may also be used. The carrier may suitably be shaped, for example, as small spheres, or as hollow cylinders.

Any suitable method of preparing the sorbing composition may be employed. Conveniently, the composition may be prepared by impregnating a carrier with a solution of soluble salts of the three metals, which salts may be decomposed to the oxides on heating, and thereafter decomposing the salts. The salts used are preferably nitrates, although soluble carboxylates, e.g. acetates, or mixtures of different solutions may also be used.

The proportion of alkaline earth metal or alkali metal present in the composition is generally at least 1 percent by weight expressed as the weight of the metal oxide in relation to the total weight of the composition. The proportion will generally not exceed 30 percent by weight. Preferably the proportion is from 2 to 10 percent, and more preferably from 4 to 7 percent.

The proportions in the composition of the uranium and thorium oxides expressed as the weight of uranoso-uranic oxide, $U_3O_8$ and thorium dioxide, $ThO_2$ respectively, in relation to the total weight of the composition, are each generally at least 1 percent and not more than 30 percent. Preferably the proportions are each in the range of from 2 to 15 percent and more preferably in the range of from 2 to 10 percent.

There is further provided according to the invention, a process for the removal of sulphur oxides from sulphur oxide containing gas (such as flue gases and like gaseous mixtures), which process comprises contacting the gas with a composition comprising an oxide of uranium, an oxide of thorium, an oxide of an alkaline earth metal or an alkali metal, preferably sodium oxide, whereby sulphur oxides present in the gas is sorbed on the surface of the composition.

We have found that the presence of oxygen in the gas serves to increase considerably the sorption of sulphur oxides. If, therefore, the gas to be treated contains only a negligible quantity of oxygen, it may be desirable to add extra oxygen, suitably by adding air to the mixture. Generally there should be at least 1 percent by volume of oxygen present in the gas to be treated. Preferably the gas comprises at least 2 percent although larger amounts may be used, e.g. 5 percent.

According to one embodiment of the process of the invention the gas is passed through a reactor vessel containing the sorbing composition. The temperature of the gas entering the reactor may be from 280° C. to 750° C., and may be the temperature of the gas leaving a waste-heat boiler, normally about 330° C. The space velocity of the gas through the reactor is preferably 3500 hr.$^{-1}$ to 4000 hr.$^{-1}$, although velocities up to 6000 hr.$^{-1}$ or even 1000 hr.$^{-1}$ may be used.

As greater quantities of sulphur oxides are sorbed on the composition, so the sorbing efficiency of the composition decreases. The gas flow must therefore be stopped after a period of time, so that the sorbed sulphur oxides may be removed. Suitably, two or more reactors, containing the sorbing composition may be employed, so that, when the flow of gas to a reactor must cease, and the sorbed sulphur oxides removed, the flow of untreated gas may be channelled to another reactor containing a clean sorbing composition.

The sorbed sulphur oxides may be removed from the composition by contacting it wtih hydrogen, or a gaseous mixture containing hydrogen, e.g. a hydrogen/steam mixture possibly produced by a steam reforming process. The flow of hydrogen may suitably be from 1000 hr.$^{-1}$ to 5000 hr.$^{-1}$, preferably from 1800 hr.$^{-1}$ to 2000 hr.$^{-1}$. The temperature of the composition during the contact with hydrogen is preferably raised to a temperature of at least 600° C., preferably from 670° C. to 680° C., e.g. 680° C. Higher temperatures such as up to 1000° C. may be used but render the process less economical. The sorbed sulphur oxides are converted to hydrogen sulphide, and thus passes out of the reactor.

The hydrogen sulphide so produced, may thereafter if desired, be converted to sulphur in a Claus kiln. In this connection, reference is made to our copending patent application No. 39,223 which describes and claims a Claus kiln process for the production of sulphur from a gaseous mixture containing hydrogen sulphide and sulphur dioxide, which process comprises contacting the gaseous mixture in a reactor vessel with a catalyst comprising one or more oxides of uranium, whereby hydrogen sulphide and sulphur dioxide are reacted together to yield sulphur.

The process of the invention may also be used to provide some or all of the hydrogen sulphide necessary for a Claus kiln process. Thus in one embodiment of the invention the effluent from a Claus kiln is passed through a reactor comprising a composition of the present invention. Sulphur dioxide in the effluent is thereby removed and is converted, by the action of hydrogen, to hydrogen sulphide which is recycled into the Claus kiln. The process conditions under which the Claus kiln is operated may suitably be regulated so that virtually no hydrogen sulphide is contained in the effluent. After contact with the composition of the invention, therefore, the remaining effluent gases may be discharged into the atmosphere without further desulphurisation.

It may be desirable to conduct the sorption of the sulphur oxides onto the sorbing composition at a temperature similar to that used for regenerating the composition, e.g. at a temperature of 650° C. to 750° C. The sorption is slightly less efficient at this temperature when the composition contains sodium, but the necessity to cool the sorbing composition is obviated. Consequently, the sorption, after regeneration, is initiated at the temperature of which regeneration was carried out, the flow of gas being used to cool the composition and render sorption more efficient. This procedure is possible only because the sorptive efficiency of the composition of the invention is still high at high temperatures. Compositions containing lithium as the alkali metal are even more efficient than those containing sodium at temperatures of 650° C. to 750° C., and temperature changes during the sorption/regeneration cycles can be avoided with these compositions whilst high efficiency is maintained.

It is not yet certain precisely in what manner the sulphur oxides are sorbed by the sorbing composition. It may be that some form of sulphite is formed, as appears to be the case where sodium oxide is employed by itself. Whatever kind of bond is formed, however, it appears to be considerably weaker than that formed with sorbers consisting essentially of sodium oxide, as is evidenced by the relatively low temperatures required to regenerate the sorber. Comparative tests also give evidence of a synergistic effect of the combination of the three metallic components. The absence of any one of the three components results in a composition of much reduced sorption effectiveness.

There is little doubt that when sodium is present it is the most important species in the sorption process due to the reaction:

$$Na_2O + SO_2 \rightarrow Na_2SO_3 \quad (1)$$

or $$Na_2Al_2O_4 + SO_2 \rightarrow Na_2SO_3 + Al_2O_3$$

followed by $$Na_2SO_3 + \tfrac{1}{2}O_2 \rightarrow Na_2SO_4 \quad (2)$$

Subsequent reduction of the sodium sulphate by hydrogen regenerates sodium oxide.

$$Na_2SO_4 + 4H_2 \rightarrow Na_2O + H_2S + 3H_2O \quad (3)$$

The role of uranium oxides in the process is at first sight not quite so well defined, but it is though that most of the sodium present in the composition is associated with uranium according to the formula $Na_2O \cdot (UO_3)_2$. It is considered that this species plays an active part in the adsorption/regeneration processes. If for instance as is quite probable, reaction (2) above is the rate controlling step, it follows that any substance that acts to accelerate this step has a desirable effect on the process as a whole. It is postulated that uranium has just such an effect, acting as an oxygen carrier according to the following reaction.

$$Na_2SO_3 + UO_3 \rightarrow Na_2SO_4 + UO_2 \quad (4)$$

in the oxidising conditions of the sorption stage the dioxide will be immediately oxidised back to $UO_3$. The above scheme is of course highly idealised; it is not for instance thought that the reaction $UO_3 \rightarrow UO_2$ takes place quantitatively. It is considered that oxygen is taken up by, and released from a stable uranium oxide lattice, a phenomenon well precedented and of minimal energy requirements. It may be that reaction (4) is so fast that this stage of the process is no longer rate controlling.

The role of thorium in the process is uncertain, although possibly, its only function is to increase the available surface.

In order that the invention may be more clearly understood, there follows a description of specific embodiments of the composition and of the process of the present invention.

EXAMPLE 1

Preparation of sorbing composition

The composition was prepared by dipping 2-4 mm. α-alumina microspheres (water sorption 22%) in a mixed nitrates solution (Th:U:Na ratio 1:1:1) and decomposing the metal nitrates at 600° C.

The composition was given four dips to give a final analysis of:

| | Percent |
|---|---|
| Th | 9.5 |
| U | 7.7 |
| Na | 4.3 |

This analysis refers to percent metal.

Plant and process

The reaction tube was charged with 20 ccs. of absorbing composition, the ends of the tube being packed with inert ceramic rings. The composition temperature was raised at 320° C. and flue gas, at a rate of 80 l./hour (S.V. 4000) was passed over the composition for 1 hour. The inlet and outlet $SO_2$ contents of the gas were measured by passing the gas through neutralised hydrogen peroxide and titrating the sulphuric acid so formed with standard alkali. At the end of this period the flue gas flow was stopped and the temperature of the composition was raised to 680° C. Hydrogen (5 l./hour) and steam (5 l./hour) were then passed over the composition for 1 hour, the resultant hydrogen sulphide being collected in cadmium acetate solution and determined iodometrically.

A synthetic flue gas was used. The components were mixed in a gas cylinder and steam added at the inlet to the reactor.

FLUE GAS ANALYSIS (BY VOLUME)

| | For cycles 1-9, percent | For cycle 10— percent |
|---|---|---|
| $CO_2$ | 8.7 | 9.2 |
| $O_2$ | 1.7 | 1.7 |
| $H_2$ | 79.4 | 78.8 |
| $SO_2$ | 0.21 | 0.29 |
| $H_2S$ | 10.0 | 10.0 |

RESULTS

| Cycle Number | Percent SO₂ removed in absorption | Weight of sulphur— On composition, grams | Weight of sulphur— Recovered as H₂S, grams | Percent sulphur recovered from composition |
|---|---|---|---|---|
| 1 | 93 | 0.264 | 0.139 | 53 |
| 2 | 97 | 0.275 | 0.187 | 68 |
| 3 | 96 | 0.271 | 0.242 | 90 |
| 4 | 94 | 0.265 | 0.253 | 96 |
| 5 | 95 | 0.257 | 0.242 | 94 |
| 6 | 95 | 0.268 | 0.254 | 95 |
| 7 | 94 | 0.273 | 0.249 | 92 |
| 8 | 93 | 0.275 | 0.255 | 93 |
| 9 | 94 | 0.280 | 0.272 | 97 |
| 10 | 90 | 0.349 | 0.319 | 92 |

EXAMPLE 2

Preparation of sorbing composition

The composition was prepared by impregnation of α-alumina spheres in a manner similar to that described in Example 1. The analysis of the composition was as follows:

|  | Percent |
|---|---|
| U | 4.5 |
| Th | 6.5 |
| Na | 3.3 |

This analysis refers to percent metal.

The plant and process employed in this example were as those in Example 1 except that in the first cycle the absorption was begun at 680° C. the temperature falling to 425° C. after one hour. In the second cycle the absorption was maintained at 680° C.

The synthetic flue gas employed was that used in cycle 10 of Example 1.

The results of the two cycles were as follows:

RESULTS

| Cycle | Percent SO₂ removed in absorption | Weight of sulphur on composition, grams |
|---|---|---|
| 1 | 84 | 0.306 |
| 2 | 89 | 0.384 |

EXAMPLE 3

Preparation of sorbing compositions

Preparation of the composition involved four dips of a specially prepared high water adsorption corundum support (α-alumina supplied by Price-Pearson Ltd. and having a water absorption of 31%) in a solution of lithium, thorium and uranyl nitrates, although 50% of the lithium was dissolved as the acetate. Firing of the adsorbent at 800° C. between dips and after the final dip give a product containing 1.97% thorium, 4.22% uranium and 4.84% lithium as the oxides, although a fraction of the lithium would be present as the carbonate as this is the decomposition product of the acetate at 800° C. These oxides were disposed on the inert support. This sorbing composition was then sized into 3/16" to 1/16" granules and loaded into the central portion of a 2'6" long stainless steel reactor tube. The weight of composition was 105 grams and its volume 130 cc.

Process

A synthetic flue gas with approximately 2000 p.p.m. sulphur dioxide was passed over the composition at space velocities varying from 5,000 to 10,000 and at a temperature of 680° C. Regeneration of the composition was effected by the passage of a steam/hydrogen mixture at a space velocity of 1,000 and a temperature of 680° C.

Figure 2:
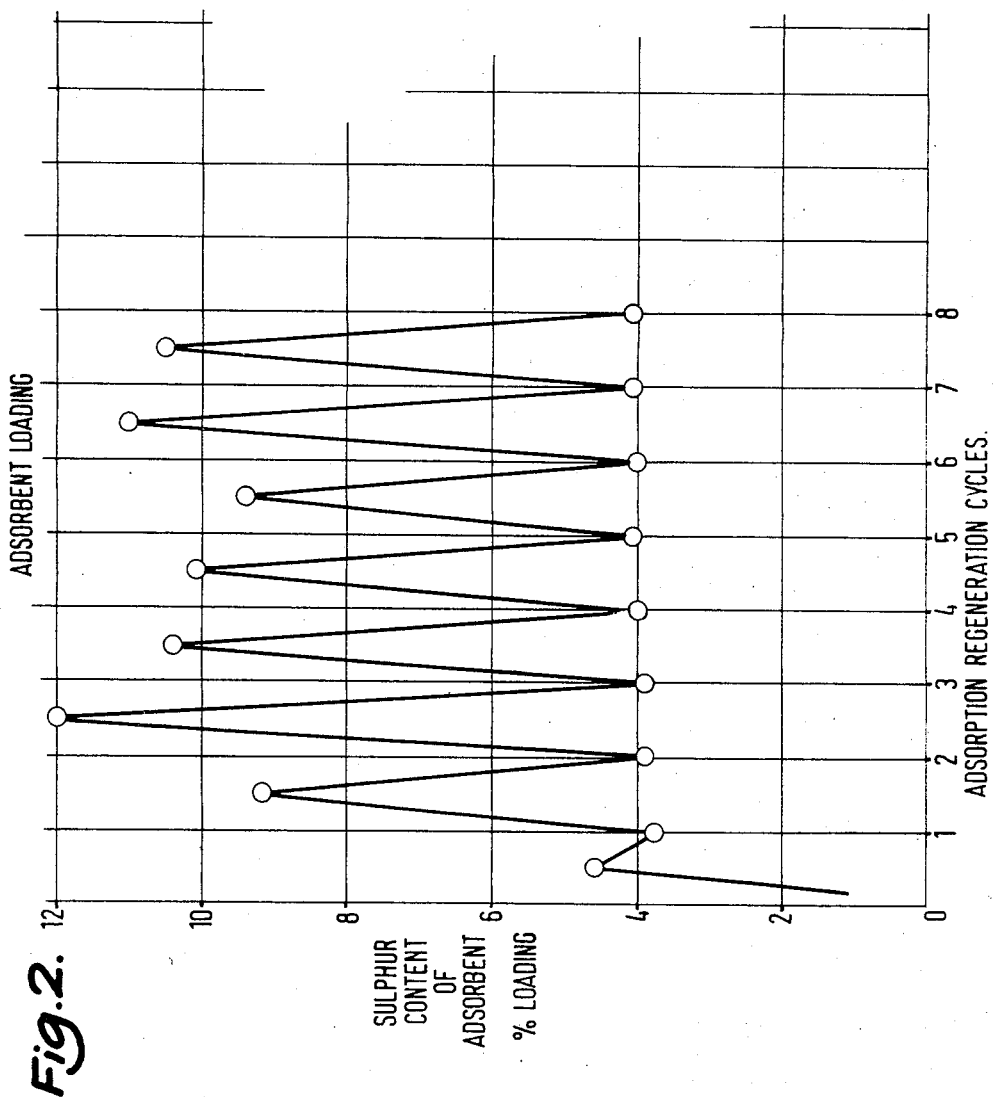

Results: FIG. 1 of the accompanying drawings is a graph in which the efficiency of sulphur dioxide adsorption is plotted as a function of time for the first five sorption runs. The graph shows that at no stage did the efficiency fall below 95% before three hours had elapsed. The space velocity was varied as shown between 5,000 and 10,000, and as the sorption temperature was 680° C. this data is very much better than comparable data using sodium based adsorbents. FIG. 2 of the accompanying drawings illustrates the sulphur loading of the sorbing system during successive adsorption/regeneration cycles, which can be seen to vary between 4% to 11%. This minimum loading factor had been noted previously using sodium based sorbing compositions.

During all the runs the process condensate was analysed for lithium, thorium and uranium, no significant loss was detected. The sorbing composition was tested through eight cycles without any deterioration in performance, and then unloaded from the reactor tube in order to inspect any physical or chemical deterioration. Visual observation showed that no physical damage had been suffered.

It is apparent from the data in this example that lithium based sorbing compositions have quite considerable advantages over similar sodium based compositions. Some of these advantages are outlined below.

(1) A minimum sorption efficiency of 95% at a space velocity of up to 10,000 for a period of 3 hours, and at a temperature of 680° C. Sodium based compositions do not have this high efficiency under these conditions.

(2) 100% regeneration can be attained at 680° C., avoiding the costly operation of elevating and lowering the temperature during sorption/regeneration cycles.

(3) 5.0% w./w. adsorbent (i.e. one containing 5% lithium metal) has a maximum loading capacity of 11.5% compared with 3.5% using sodium and 2.05% using potassium.

(4) Minimal loss of lithium in the process condensate.

I claim:

1. A process for the removal of sulphur oxides from sulphur oxide containing gas, which process comprises contacting the gas with a composition which comprises (I) a member selected from the group consisting of an oxide of uranium, a precursor therefor, and mixture thereof (II) a member selected from the group consisting of an oxide of thorium, a precursor therefor and a mixture thereof and (III) a member selected from the group consisting of an oxide of an alkali metal, and oxide of an alkaline earth metal, a precursor therefor, and mixtures thereof, whereby the sulphur oxides are sorbed onto the composition.

2. The process of claim 1 wherein the uranium (expressed as uranoso-uranic oxide) is present in an amount of 2 to 15% by weight of the composition; the thorium (expressed as thorium dioxide) is present in an amount of 2 to 15% by weight of the composition; and the member selected from the group consisting of the alkali metal and the alkaline earth metal (expressed as the oxide) is present in an amount of 2 to 10% by weight of the composition.

3. A process as claimed in claim 1 wherein the gas is a flue gas.

4. A process as claimed in claim 1 wherein oxygen is present in the gas in an amount of at least 1% by volume.

5. A process as claimed in claim 1 wherein the temperature is from 280° C. to 750° C.

6. A process as claimed in claim 1 which includes the step of regenerating the composition with a hydrogen-containing gas.

7. A process as claimed in claim 6 wherein the regenerating step is carried out at a temperature of 670° C. to 680° C.

8. A process as claimed in claim 6 wherein hydrogen sulphide produced in the regenerating step is subsequently converted into sulphur.

References Cited

UNITED STATES PATENTS

| | | | |
|---|---|---|---|
| 1,198,542 | 9/1916 | Harding | 23—2 E X |
| 2,992,884 | 7/1961 | Bienstock et al. | 23—2 S |
| 3,459,682 | 8/1969 | Bressat et al. | 23—2 S |
| 3,615,196 | 10/1971 | Welty | 23—2 S |
| 3,649,169 | 3/1972 | Nicklin et al. | 23—2 S |

FOREIGN PATENTS

| | | | |
|---|---|---|---|
| 835,751 | 5/1960 | Great Britain | 23—2 S |
| 944,207 | 12/1963 | Great Britain | 23—2 S |

OSCAR R. VERTIZ, Primary Examiner

G. O. PETERS, Assistant Examiner

U.S. Cl. X.R.

423—563, 540